(12) United States Patent
Applebaum (10) Patent No.: US 10,656,343 B1
(45) Date of Patent: May 19, 2020

(54) FIBER OPTIC VISUAL FAULT LOCATOR

(71) Applicant: COTSWORKS, LLC, Highland Heights, OH (US)

(72) Inventor: Ken Applebaum, Cleveland Heights, OH (US)

(73) Assignee: COTSWORKS, LLC, Highland Heights, OH (US)

( * ) Notice: Subject to any disclaimer, the term of this patent is extended or adjusted under 35 U.S.C. 154(b) by 0 days.

(21) Appl. No.: 16/266,893

(22) Filed: Feb. 4, 2019

(51) Int. Cl.
*G02B 6/38* (2006.01)
*G01M 11/00* (2006.01)
*H01R 13/627* (2006.01)
*G02B 6/44* (2006.01)
*G02B 6/42* (2006.01)

(52) U.S. Cl.
CPC ............. *G02B 6/385* (2013.01); *G01M 11/31* (2013.01); *G02B 6/381* (2013.01); *G02B 6/4284* (2013.01); *G02B 6/4401* (2013.01); *H01R 13/6271* (2013.01)

(58) Field of Classification Search
CPC ...................................................... G02B 6/385
See application file for complete search history.

(56) References Cited

U.S. PATENT DOCUMENTS

| 5,196,899 | A | * | 3/1993 | Serwatka | G01M 11/30 356/73.1 |
| 7,778,510 | B2 | * | 8/2010 | Aronson | G02B 6/4292 385/100 |
| 8,208,134 | B1 | * | 6/2012 | Gunal | G01M 11/33 356/73.1 |
| 2005/0099782 | A1 | * | 5/2005 | Kim | G02B 6/3897 361/740 |
| 2005/0264299 | A1 | * | 12/2005 | Manani | H04B 3/56 324/539 |
| 2009/0196624 | A1 | * | 8/2009 | Zhang | H04B 10/40 398/135 |
| 2012/0236294 | A1 | * | 9/2012 | Smith | G01M 11/3109 356/73.1 |
| 2014/0024255 | A1 | * | 1/2014 | Robitaille | H04B 10/40 439/607.2 |
| 2016/0381123 | A1 | * | 12/2016 | Kanne | H04Q 9/00 709/224 |

* cited by examiner

*Primary Examiner* — Sung H Pak
(74) *Attorney, Agent, or Firm* — Tucker Ellis LLP (57) ABSTRACT

A visual fault locator includes a housing; a receptacle retained by the housing and configured to receive a connector of a fiber optic cable under test; a light source retained by the housing and positioned relative to the receptacle to emit light into a filament of the fiber optic cable under test; and an interface in the form of an electrical connector retained by the housing. The housing is physically configured so as to be installed in and removed from a port of a host device, such as a network communications. The visual fault locator receives operational power for the light source from the host device via the interface. Optionally, operational commands for controlling a state of the light source are received from the host device over the interface.

15 Claims, 5 Drawing Sheets

FIBER OPTIC VISUAL FAULT LOCATOR

BACKGROUND

A break in the core of a fiber optic cable often causes failure of the optical link between two optical transceivers or associated optical network devices. To help diagnose the cause of this type of mechanical failure and to test a new or repaired fiber optical cable, tools have been developed to inspect for such a break. One such tool is a Visual Fault Locator (VFL). VFLs operate by connecting a fiber optic connector (sometimes referred to in the military and aerospace industries as a terminus) of a fiber optical cable to be inspected to a compatible port of the VFL. The port of the VFL typically is not a receptacle that coordinates with the connector. Rather, to accommodate multiple connector types and/or ferrule sizes (e.g., 1.25 mm ferrules and 2.5 mm ferrules), the port merely engages the ferrule at the terminal end of the cable under test. Therefore, the connector of the cable under test is only loosely secured to the port and the connector may easily become detached from the port if not held in place.

The VFL illuminates the core of the fiber optical cable with laser light in the visual spectrum. Typically, red laser light is used. When the light is incident on a break in the core of the fiber optical cable, the light will "leak" from the break and, depending on the jacket arrangement, will be visible at the break in the core through the cladding and jacket of the fiber optical cable. During illumination, a person may visually inspect the cable for breaks by looking for leaking light. This technique is most applicable for testing fiber optical cables with relatively short lengths, such as lengths of 200 meters or less.

Currently available VFLs are hand-held tools that include all functional components of the VFL in a housing, such as electronics, a power source (e.g., batteries), and the emitting laser. The port for the connector of the fiber optic cable is mounted to the housing. A button board that retains user control buttons is also mounted to the housing. Some VFLs may be operated to continuously emit laser light and/or to pulse the laser light. Most VFLs may be used to test multimode fibers and single mode fibers. VFL functionality also may be found in more advanced test equipment, such as an optical power meter or an optical time-domain reflectometer (OTDR).

Figure 1:
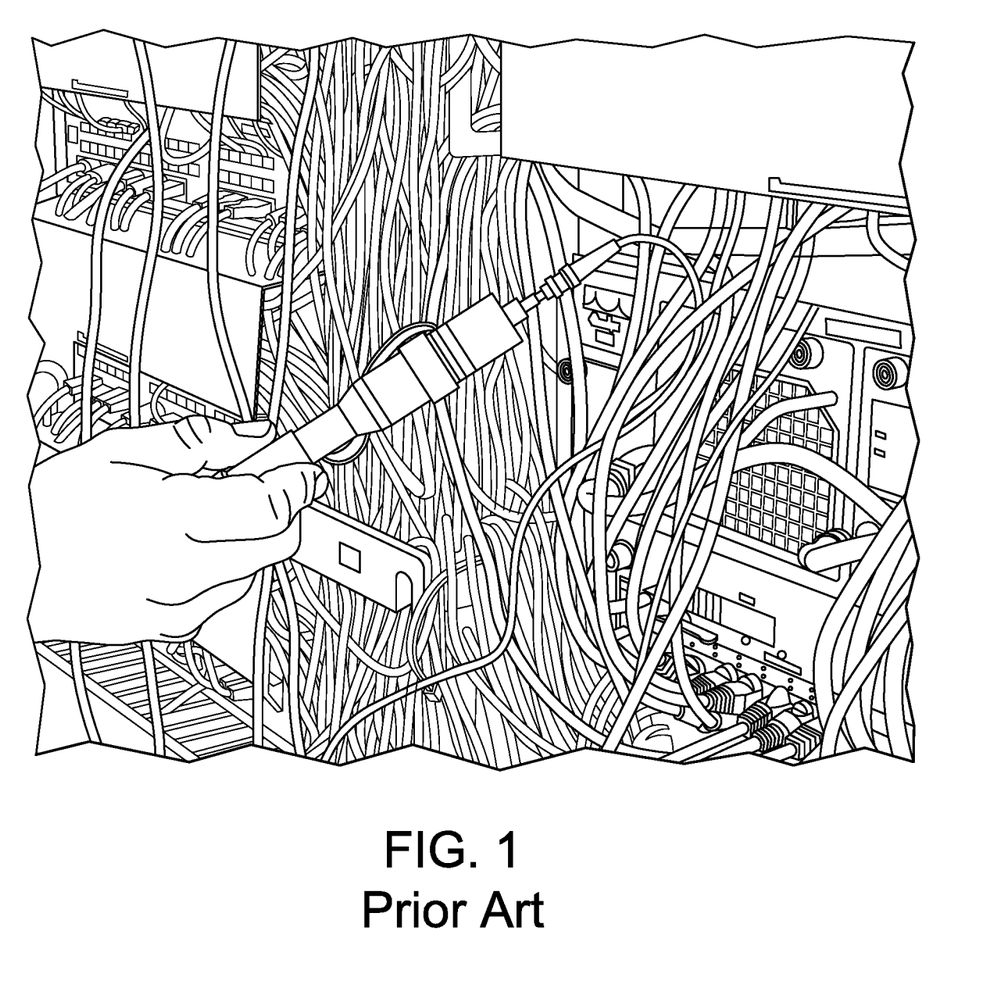
FIG. 1 shows an exemplary conventional visual fault locator device while in use in a data center.

The conventional VFL form-factor is portable, but is often inconvenient to use to test cables that have been connected to rack-mounted optical network devices (e.g. network data switches). An exemplary commercially available VFL while in use in a data center is shown in FIG. 1. As can be seen, one problem with conventional VFLs is that the VFL must be physically supported in a tight space and the operator may need to hold the connector into the port of the VFL. This can be a difficult task if the operator is not assisted by another person and needs to leave the location of the VFL to inspect the cable being tested or engage in other activities involving the user's hands.

SUMMARY

Disclosed is a VFL in a small form factor, such as a form factor compatible with IEEE's Multi-Source Agreement (MSA) receptacle for Small Form Factor (SFF) electronics. This is the form factor according to which many hot-pluggable datacomm-style transceivers are made. The disclosed VFL fits in and receives operating power from an industry standard port (e.g., an SFF port) that is normally used for optical communication devices. Optionally, the VFL receives communication information from the port in addition to operating power.

According to one aspect of the disclosure a visual fault locator includes a housing; a receptacle retained by the housing and configured to receive a connector of a fiber optic cable under test; a light source retained by the housing and positioned relative to the receptacle to emit light into a core of the fiber optic cable under test; and an interface in the form of an electrical connector retained by the housing. The housing is physically configured so as to be installed in and removed from in a port of a host device, such as a network switch. The visual fault locator receives operational power for the light source from the host device via the electrical interface.

DETAILED DESCRIPTION

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Figure 2:
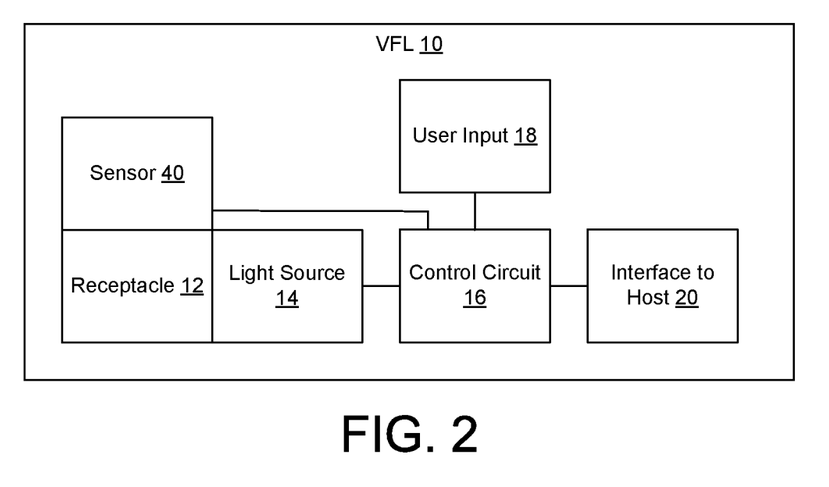
FIG. 2 is a schematic block diagram of a visual fault locator (VFL) according to aspects of the disclosure.

Referring to FIG. 2, illustrated is a schematic block diagram of a visual fault locator (VFL) 10 according to aspects of the disclosure. The VFL 10 includes a receptacle 12 to which a connector (also referred to as a terminus) of a fiber optic cable may be installed and retained without further mechanical support. In one embodiment, the receptacle 12 latches the connector therein to reduce the possibility that the connector unintentionally separates from the receptacle 12. A fiber optic cable that is connected to the VFL 10 for testing will be referred to as a cable under test. The receptacle 12 may be an industry standard receptacle for fiber optic cable connectors such as, but not limited to, an LC receptacle, an ST receptacle, or an FC receptacle.

The VFL 10 further includes a light source 14. The light source 14 may include one or more light emitters, preferably one or more solid state light emitters. The light source 14 and the receptacle 12 are arranged so that, when a cable under test is connected to the receptacle 12, light from the light source 14 is introduced into the terminal end of a core (including the filament) of the cable under test. The light will propagate along the cable under test and, if there is a break in the core, the light will escape from the core. This allows for visual inspection of the cable under test. The light source 14 may be any suitable device. The light source 14 may be, for example, a one or more laser diodes or one or more a vertical-cavity surface-emitting lasers (VCSELs). The VFL 10 need not have an optical receiver for detecting or demodulating data in an optical signal, but it is possible to include an optical receiver to provide for more advanced test capabilities. Also, the VFL 10 may not be capable of transmitting communications data in an optical signal, but it is possible to include an optical transmitter to provide for more advanced test capabilities.

The light source 14 may emit light in the visible spectrum such as, but not limited to, red light, green light, blue light or light of another color. In one embodiment, the VFL 10 may have multiple light emitters that are selectively turned on and off to change the wavelength of the emitted light (e.g., switch between red light and green light) or a light emitter that is capable of changing its emitted wavelength. The light source 14 alternatively may emit light outside the visible spectrum, in which case the operator may use an appropriate detector or wavelength changing glasses to inspect for a break in the cable under test.

Operations of the VFL 10 are controlled by electronics in the form of a control circuit 16. The control circuit 16 may include a driver for driving the light source 14. The control circuit 16 may receive control input signals from a user input 18. The user input 18 may be one or more buttons, rotary dial switch, and/or switches, and may be used to control one or more operational states of the light source 14. For example, the user input 18 may be used to control an on/off state of the light source 14. In one embodiment, the light source 14 may be controlled to be either on or off. When on, the light source 14 steadily emits light and, when off, does not emit light. In another embodiment, the light source 14 may have one or more pulse modes in which the light source 14 emits light in pulses with a predetermined duty cycle. In one embodiment, the light source 14 may have a pulsed mode and/or a modulated mode in addition to on and off modes. In one embodiment, the output intensity of the light intensity of the light source 14 is fixed and cannot be varied by the user. In other embodiments, an output intensity of the light source 14 may be variable and controllable by the user through use of the user input 18. In embodiments where the wavelength of the emitted light may be changed, the emitted wavelength may be controlled with the user input 18. Also, the VFL 10 may be controlled or preconfigured programmed to emit light for a specified duration.

As indicated, the optical power of the light emitted by the light source 14 may be altered. In one embodiment, the emitter or emitters of the light source 14 may be driven to emit more or less light. In another embodiment, the light source 14 has two or more light emitters that are selectively operated (e.g., individually turned on or off and/or individually driven to emit more or less light) to vary the collective optical power of the light emitted by the light source 14. For instance, the light source 14 may include an array or matrix or VCSELs or other light emitters. Each VCSEL may be individually controlled to emit light or not emit light, emit light that is pulsed or modulated, and/or emit light of varying intensity so as to collectively emit light with desired optical characteristics, such as optical power, intensity and/or wavelength. In one embodiment, the light source 14 may have an array or matrix of four VCSELs. It is contemplated that operating a single VCSEL in this arrangement may result in emitting light of a class 1 laser, which may be used to inspect for breaks in a fiber optic cable of about 100 meters in length. Similarly, operating two VCSELs in this arrangement may result in emitting light of a class 2 laser, which may be used to inspect for breaks in a fiber optic cable of about 1 kilometer in length. Operating four VCSELs in this arrangement may result in emitting light of a class 3 laser, which may be used to inspect for breaks in a fiber optic cable of about 10 kilometers in length. To maintain eye safety, the VFL 10 may include a light meter (e.g., a monitor diode) that monitors the optical power of the light emitted by the light source 14. An output of the light meter may be input to the control circuit 16, which uses the output value to regulate the light output by the light source 14 and/or limit the light output by the light source 14 to a predetermined threshold. In one embodiment, the operator may use eye safety equipment (e.g., light attenuating glasses) and control the VFL 10 to emit light above the predetermined threshold.

As mentioned, the VFL 10 is used to inspect for breaks in a cable under test. As used herein, the term break include full cracks in the core or filament of the cable under test, a partial crack in the core or filament of the cable under test, a hairline fracture in the core or filament of the cable under test, and a mircobend or other imperfection caused by manufacturing defect or otherwise in the core or filament of the cable under test. As will be understood, some breaks may not be visibly detectable if the output power of the light source 14 is relatively low. Therefore, depending on the length of the cable under test, there are times when it may be advantageous to increase the optical power of the light emitted by the light source 14 as described above.

As indicated, visually detecting light output from the cable under test at a break includes detection by the eyes of a human operator with or without an assistance device (e.g., wavelength changing glasses). As used herein, the terms visually detecting light and light that is visually detectable include detection by the aided or unaided eyes of a human operator or by a machine. Exemplary machines that may detect light output at a break in a cable under test may include a machine vision apparatus, a spectrum analyzer, or other system.

In one embodiment, the VFL 10 does not have its own power source (e.g., one or more batteries) to operate the control circuit 16, the user input 18 and the light source 14. In this case, the VFL 10 relies on power from a host device, such as a data center switch. For this purpose, the VFL 10 has an interface 20 to the host. The interface 20 may be an electrical connector that mates with a corresponding connector of the host. In one embodiment, only power is received by the VFL 10 from the host and no communications are made between the VFL 10 and the host. In other embodiments, communications between the VFL 10 and the host may be made. For instance, some hosts may require devices that are installed in a port of the host to be an authorized device. In this case, the VFL 10 and the host may engage in a handshake routine to confirm that the VFL 10 is authorized. In other cases, a user may enable the port through a software interface with the host. In still other embodiments, control over the operation of the VFL 10 may be made using the software interface that communicates with the VFL 10 by way of the interface instead of or in addition to controlling the VFL 10 by way of the user input 18. Following installation, the VFL 10 may receive power from the host. A ground connection between the VFL 10 and the host also may be made via the interface 20. In one embodiment, and as explained in greater detail below, the interface 20 may be a small form factor (SFF) interface pursuant to the IEEE-defined Multi-Source Agreement (MSA) for SFF electronics. Other possible interfaces 20 include proprietary connectors, universal serial bus (USB) connectors, etc.

The VFL 10 may be self-contained. In this configuration, the VFL 10 has a housing that retains the receptacle 12, the light source 14, the control circuit 16, the user input 18 and the interface 20. The physical configuration also may conform to the SFF industry standard.

Figure 3:
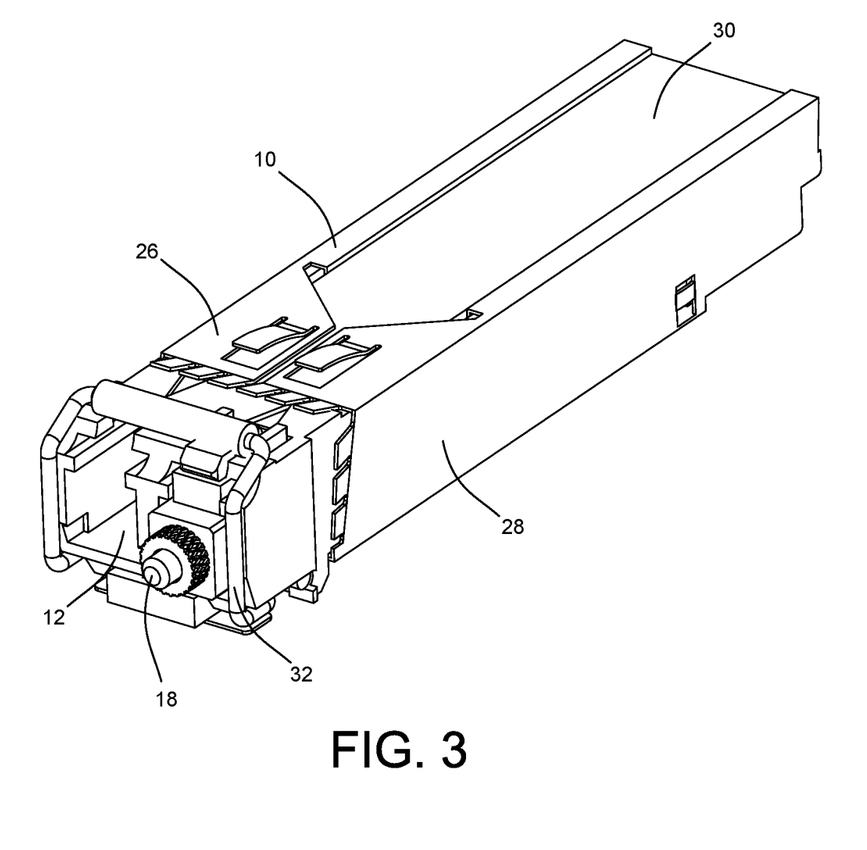
FIG. 3 is a front perspective view of a representative embodiment of the VFL.
Figure 4:
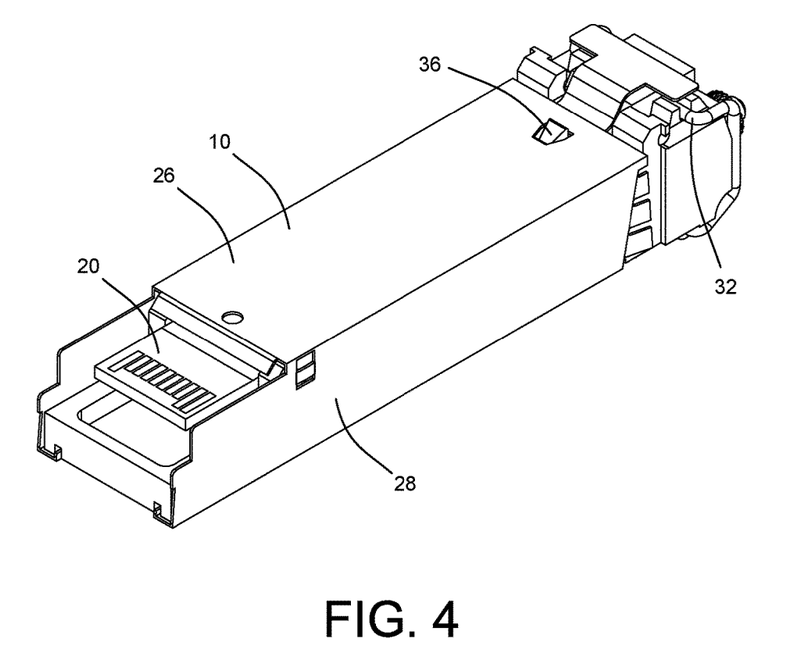
FIG. 4 is a rear perspective view of the representative embodiment of the VFL.
Figure 5:
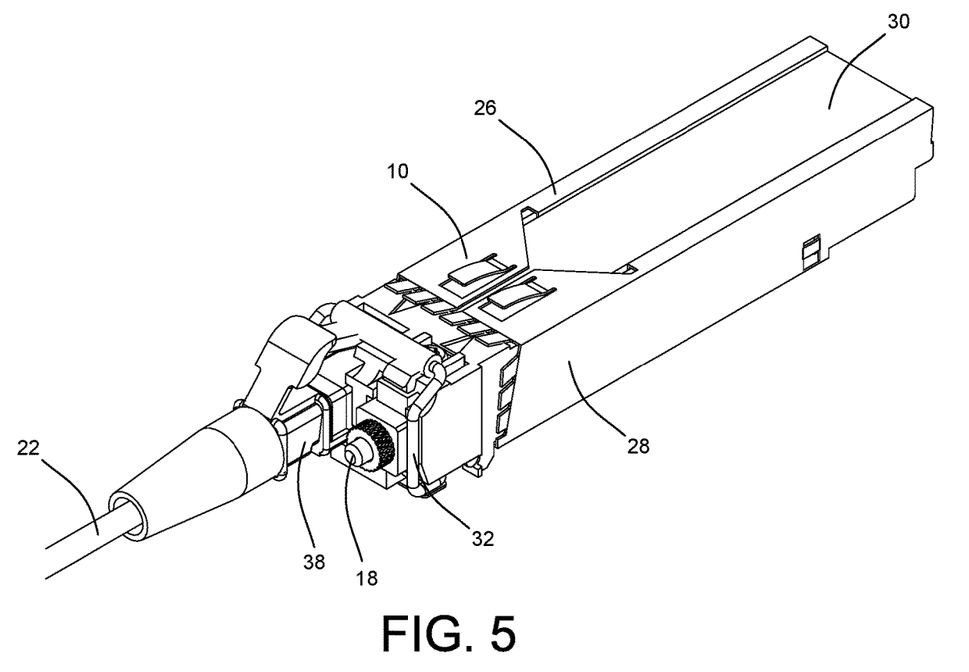
FIG. 5 is another front perspective view of the representative embodiment of the VFL with a fiber optical cable connected thereto.
Figure 6:
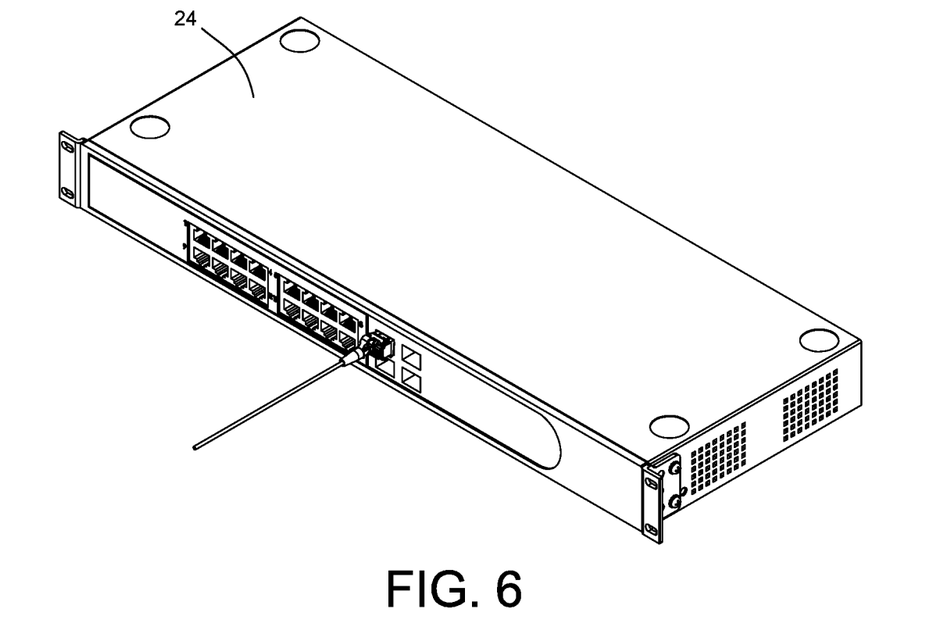
FIG. 6 is an optical network device having the VFL connected thereto.
Figure 7:
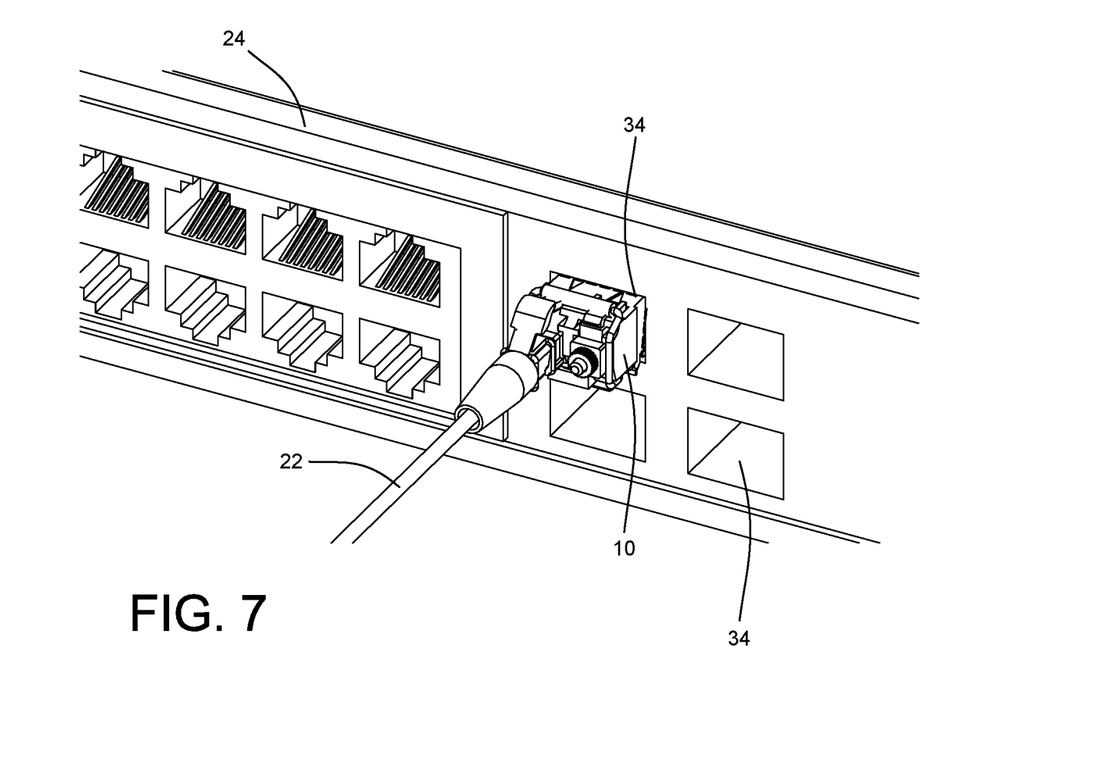
FIG. 7 is an enlarged area of the data switch of FIG. 6 having the VFL connected thereto.

With additional reference to FIGS. 3 through 7, a representative embodiment of a self-contained VFL 10 is illustrated. FIGS. 3 and 4 show the VFL 10 in isolation. FIG. 5 shows the VFL 10 with a cable under test 22 connected to the receptacle 12 of the VFL 10. FIGS. 6 and 7 show the VFL 10 retained by a host 24.

In the illustrated embodiment, the VFL 10 physically and/or electrically conforms to the MSA for SFF electronics. The VFL 10 may further have a small form factor pluggable (SFP) configuration (e.g., so as to be hot-pluggable). Other MSA or non-MSA form factors are possible such as, but not limited to, an XFP form factor, an SFP form factor, a CFP, CFP2 or CFP4 form factor, a CXP form factor, a dual pluggable SFP form factor, etc. In accordance with the desired form factor, the VFL 10 has a housing 26 that is compatibly pluggable (including removable) into a coordinating port 34 (FIG. 7) of the host 24. The housing 26 of the illustrated embodiment includes a cast metal base 28 and a sheet metal top 30. In the typical embodiment, the port 34 of the host 24 is arranged to mechanically receive and electrically interface with a data communications device to operatively establish optical data communications with a remote end over a fiber optical cable connected to the data communications device.

The VFL 10 may include a bail latch 32. The bail latch 32 is shown in the latched position. When inserting or removing the VFL 10 from the port 34 of the host 24, the bail latch 32 may be pivoted downward to disengage and/or allow release of a latching feature 36 (FIG. 4) of the VFL 10 from a corresponding feature of the host 24. In the illustrated position, the bail latch 32 may latch the latching feature 36 of the VFL 10 with the host 24. In one embodiment, the bail latch 32 alternatively and/or additionally serves as a user input 18. For this purpose, the position of the bail latch 32 is detectable by a sensor or switch of the VFL 10 and the sensed position serves as an input to the control circuit 16.

The receptacle 12 of the VFL 10 of the illustrated embodiment is an LC receptacle. Accordingly, a connector 38 (FIG. 5) of the cable under test 22 in the illustrated embodiment is an LC connector. Other receptacle and connector types may be used.

The user input 18 of the VFL 10 of the illustrated embodiment is a push button switch. Other types of user inputs 18 are possible, such as a capacitive membrane switch, a toggle switch, a rotary dial switch, etc. The user input 18 may be used to control the VFL 10 in the manners described above. Other ways to control the VFL 10 are discussed below. The user input 18 may be located adjacent the receptacle 12 so as to be accessible when the VFL 10 is installed in the port 34 of the host 24. According to the illustrated embodiment, the VFL 10 includes two industry standard receptacles for fiber optic connectors. In this case, a first of the standard receptacles is associated with the light source 14 and forms the receptacle 12, and a second of the standard receptacle retains the user input 18. For this purpose, the user input 18 is configured to fit and latch into the physical configuration of the second standard receptacle. In one embodiment, the user input 18 may have a locking feature to prevent inadvertent removal of the user input 18.

Different interactions with the user input 18 may be associated with different control functions. For example, in the embodiment where the user input 18 is a push button switch, such as found in the illustrated embodiment, different interactions with the push button may be associated with different control functions. For example, if the VFL 10 has on and off modes, short depressions of the push button may alternate between turning the light source 14 on and off. If the VFL 10 has an on mode, an off mode and a pulsed or modulated mode, short depressions of the push button may cycle through these modes. Long depressions of the push button or a predetermined sequence of depressions may control the output intensity of the light source 14 (e.g., to increase or decrease the optical power of the light source 14), control the wavelength of the emitted light, etc.

The interface 20 to the host may be an industry standard electrical connector. As indicated, the VFL 10 need not engage in communications with the host 24, but may receive operating power via the interface 20. A ground connection also may be made via the interface 20. In the embodiment where the VFL 10 is configured according to MSA SFF specification, the interface 20 of the VFL 10 may connect to power and ground connectors of a coordinating connector in the host. Additional contact may be present to exchange digital diagnostic data messages with the host, through which control of the VFL 10 may be made. The connection of the interface 20 with the host 24 is not used, however, for the exchange of communications data as would be found with a data communications device configured in accordance with MSA SFF specifications.

The VFL 10 may further include a sensor 40 (FIG. 2) to detect presence or absence of the connector 38 in the receptacle 12. If the connector 38 is present, then the light source 14 may be enabled so as to emit light. If the connector 38 is not present, then the light source 14 may be disabled and prevented from emitting light. This may assist in preventing unintended exposure of laser light to a user. The sensor 40 may be a switch or an optical sensor. In another embodiment, the sensor 40 may be a continuity sensor that electrically detects presence of a conductive part of the connector 38.

The host 24 includes one or more ports 34 that are compatible with the form factor of the VFL 10. In the illustrated embodiment, the ports 34 are SFP ports 34 that may physically receive and power the VFL 10. Therefore, during operation of the VFL 10 to test the cable under test 22, the host 24 physically supports the VFL 10 and the VFL 10, in turn, physically retains and supports the cable under test 22. This frees the hands of the user to complete other tasks. Additionally, the user may move away from the terminal end of the cable under test 22 to visually inspect portions of the cable under test 22 that are not visible from the location of the terminal end. In one embodiment, the host 24 is a rack mounted data center switch (e.g., as illustrated) or other type of network equipment.

An exemplary method of using the VFL 10 will be described. It will be understood that other ways of using the VFL 10 are possible, including an embodiment where the VFL 10 remains connected to the port 34. In the exemplary method, the user disconnects a fiber optic cable that is suspected of having a break from a datacomm SFP that is in a network switch port 34. The user then removes the datacomm SFP from the network switch port 34. The VFL 10 is then installed in the network switch port 34 from which the datacomm SFP was removed. Alternatively, if the network switch has a free port, it is possible that the datacomm SFP may remain in place and the VFL 10 is installed in the free port.

Following installation of the VFL 10, the fiber optic cable that was disconnected (i.e., the cable under test 22) may be connected to the receptacle 12 of the VFL 10. The user then activates the light source 14 by interaction with the user input 18 and, if appropriate, adjusts the light source 14 in terms of intensity, color and/or other operational mode (e.g., an on mode versus a pulse mode). The user may then visually inspect the cable under test 22 for breaks. If a break is found, then the cable may be replaced or repaired, and the new or repaired cable may be tested for faults. Thereafter, the VFL 10 may be removed and the datacomm SFP may be returned to the network switch port 34. The connector of the cable under test is then installed in the receptacle of the datacomm SFP.

Figure 8:
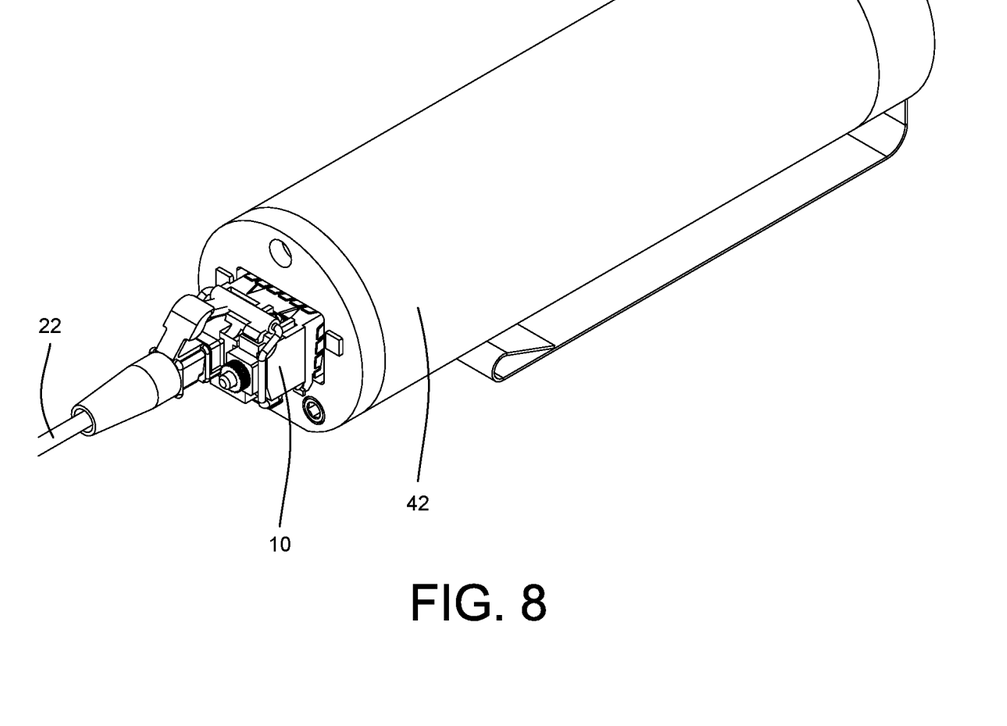
FIG. 8 is a hand-held host device module having the VFL connected thereto.

With additional reference to FIG. 8, the VFL 10 is shown installed in an SFP port of a portable host 42. A cable under test 22 is connected to the receptacle 12 of the VFL 10. The portable host 42 may include replaceable and/or rechargeable batteries that serve as a power source for the VFL 10. The portable host 42 allows the VFL 10 to be used in situations where a cable under test 22 is not in a location where compatible ports to support operation of the VFL 10 are available.

In one embodiment, the VFL 10 may communicatively interface with another device from which operational control over the VFL 10 is made. For instance, a mobile phone, a tablet or a computer may interface with the VFL 10 by way of a wired connection, by way of a wireless connection (e.g., a Bluetooth connection or a WiFi network connection), or by way of the host 24 and interface 20. The user may interact with control software executed by the other device (e.g., the mobile phone, tablet or computer) to control operation of the VFL 10, such as remotely commanding the VFL 10 to turn the light source 14 on or off, or any of the other control operations mentioned herein. This control may be carried out instead of or in addition to control operations made using the user input 18. In one embodiment, the user input 18 may be omitted. In these embodiments, the VFL 10 may be controlled remotely by the operator, such as a position in a data center but out of arm's length from the VFL 10. For instance, while inspecting the length of the cable under test, the operator may issue control commands to the VFL 10 via a portable electronic device (e.g., a mobile telephone).

In the case where control is made by way of communications through the host 24 and interface 20, the VFL 10 and host 24 may engage in the exchange of control signals. In the embodiment where the VFL 10 and the port of the host 24 are made in accordance with the MSA SFF standard, the control signals may be in the form of MSA diagnostic messages using, for example, vendor assignable data bytes.

In another embodiment, the VFL 10 communicates wirelessly with the device that executes the control software. In this case, the VFL 10 has an appropriate wireless interface. The wireless interface may have an antenna that extends out of the housing of the VFL 10 to reduce shielding that the housing may have on signal propagation. For instance, the antenna may be located next to or in place of the user input 18. In one embodiment, the antenna may be located in a cover that also serves as the user input 18. For instance, the cover may form part of a push button or a rotary dial switch.

A physical user input 18 as described in connection with the VFL 10 may be added to a data communications SFP device. In this embodiment, the user input may be used to control a dedicated function of the data communications device. For instance, many data communications SFP devices are capable of demodulating optical signals at multiple wavelengths. The user input may be used to scroll through the wavelengths. An output (e.g., an LED or MSA data event) may signal to the operator that an input data signal is present at the currently selected wavelength. In another embodiment, the user input may be used to change a data transmit wavelength.

Although certain embodiments have been shown and described, it is understood that equivalents and modifications falling within the scope of the appended claims will occur to others who are skilled in the art upon the reading and understanding of this specification. Additional aspects of the disclosure will be understood from the appended claims, which form part of this specification.

The invention claimed is:

1. A visual fault locator, comprising:
a housing;
a receptacle retained by the housing and configured to retain a connector of a fiber optic cable under test;
a light source retained by the housing and positioned relative to the receptacle to emit light into a core of the fiber optic cable under test, wherein the emitted light from the light source has a wavelength dedicated for troubleshooting a break in the core of the fiber optic cable under test by being visually detectable through a jacket of the fiber optic cable under test at a point of the break in the core; and
an interface in the form of an electrical connector retained by the housing; and
wherein the housing is physically configured so as to be removeably installed in a port of a host device so that the interface electrically connects to a mating electrical connector in the port of the host device, the visual fault locator not including a power source and receiving operational power for the light source from the host device via the interface; and
wherein the visual fault locator is not capable of transmitting communications data in an optical signal; and
the visual fault locator further comprising:
a control circuit that controls operation of the light source, the control circuit powered by the operational power from the host device via the interface; and
a physical user input retained by the housing and operable by a user to control the control circuit to turn on and turn off the light source.

2. The visual fault locator of claim 1, wherein the control circuit is further configured to receive commands to change operating states of the light source from user interface software.

3. The visual fault locator of claim 2, further comprising a wireless interface over which the commands to change operating states of the light source are received from a portable electronic device that executes the user interface software.

4. The visual fault locator of claim 1, wherein the port is configured according to Multi-Source Agreement (MSA) receptacle for Small Form Factor (SFF) electronics.

5. The visual fault locator of claim 1, further comprising a sensor for detecting presence or absence of the connector of the fiber optic cable under test in the receptacle, the light source enabled if the connector is present and light source is disabled if the connector is not present.

6. The visual fault locator of claim 1, further comprising a bail latch, the bail latch moveable between a latching position to latch the visual fault locator in the host device and a removal position.

7. The visual fault locator of claim 4, wherein the position of the bail latch serves as an input to the control circuitry of the visual fault locator.

8. The visual fault locator of claim 1, further comprising a bail latch, the bail latch moveable between a first position and a second position and wherein the position of the bail latch serves as an input to control circuitry of the visual fault locator.

9. The visual fault locator of claim 1, wherein a wavelength of light emitted by the light source is changeable.

10. The visual fault locator of claim 1, wherein an optical power of light emitted by the light source is changeable.

11. The visual fault locator of claim 10, wherein the light emitter comprises multiple light emitters that are individually operable to vary the optical power of light emitted by the light source.

12. A data communications device, comprising:
a housing and an electrical interface configured according to Multi-Source Agreement (MSA) receptacle for Small Form Factor (SFF) electronics;
a receptacle retained by the housing and configured to retain a connector of a fiber optic cable;
an optical transceiver for at least one of receiving optical data signals or transmitting optical data signals over the fiber optic cable; and
a physical user input retained by the housing and operable by a user to control an operating state of the optical transceiver.

13. The visual fault locator of claim 1, further comprising a light meter that monitors optical power of the light emitted by the light source, the control circuit regulating the emitted light based on an output of the light meter.

14. The visual fault locator of claim 1, wherein the visual fault locator does not make communications with the host device other than carrying out a handshaking routine to confirm that the visual fault locator is an authorized device.

15. The visual fault locator of claim 1, wherein the visual fault locator does not make communications with the host device.

* * * * *